United States Patent
Sakata

(10) Patent No.: US 6,350,956 B1
(45) Date of Patent: Feb. 26, 2002

(54) WIRE HARNESS PROTECTOR

(75) Inventor: Tsutomu Sakata, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/480,253

(22) Filed: Jan. 11, 2000

(30) Foreign Application Priority Data

Jan. 26, 1999 (JP) .......................................... 11-017318

(51) Int. Cl.$^7$ ................................................ H02G 3/00
(52) U.S. Cl. ...................... 174/101; 174/70 R; 16/221; 296/146.11; 296/208
(58) Field of Search ........................ 174/101, 86, 72 A, 174/135, 69, 70 R; 16/221; 296/146.11, 208

(56) References Cited

U.S. PATENT DOCUMENTS

| | | | |
|---|---|---|---|
| 3,842,386 A | | 10/1974 | Suska .............................. 339/4 |
| 3,848,361 A | * | 11/1974 | Foster et al. ................... 174/69 |
| 4,140,357 A | * | 2/1979 | Wolz et al. ..................... 174/86 |
| 4,445,299 A | * | 5/1984 | Lehikoinen et al. ........... 49/167 |
| 4,614,383 A | * | 9/1986 | Polley et al. .................. 174/69 |
| 4,653,799 A | | 3/1987 | Arai et al. .................... 296/146 |
| 5,039,828 A | * | 8/1991 | Marks et al. ................. 174/135 |
| 5,466,036 A | | 11/1995 | Stroeters et al. ............ 296/208 |

FOREIGN PATENT DOCUMENTS

| | | |
|---|---|---|
| DE | 197 02 543 A1 | 8/1997 |
| JP | 4-11751 | 1/1992 |

\* cited by examiner

*Primary Examiner*—Dean A. Reichard
*Assistant Examiner*—Adolfo Nino
(74) *Attorney, Agent, or Firm*—Banner & Witcoff, Ltd.

(57) ABSTRACT

A wire harness protector for double doors at the rear of a vehicle body is provided. The protector 10 consists of a first fixed member 11, a second fixed member 12, and a pivoting member 13. The first fixed member 11 has a tubular axle 11*b* protruding from the central portion of a closed-off cylindrical base face. The second fixed member 12 is approximately the same shape as the first fixed member 11. The pivoting member 13 is provided with a connecting frame 13*d* which connects a first cylindrical member 13*a*-1 and a second cylindrical member 13*a*-2, both of which have closed-off cylindrical upper faces and on central portions of which an outer fitting cylinder 13*b*-1 and an outer fitting cylinder 13*b*-2 are respectively provided. The tubular axles 11*b* and 12*b* of the first fixed member 11 and the second fixed member 12 are inserted into the first cylindrical member 13*a*-1 and the second cylindrical member 13*a*-2 of the pivoting member respectively, these joining in a state wherein they can swivel. When a door D' is pivoted, joining members of the wire harness protector 10 pivot to 270° C.

11 Claims, 8 Drawing Sheets

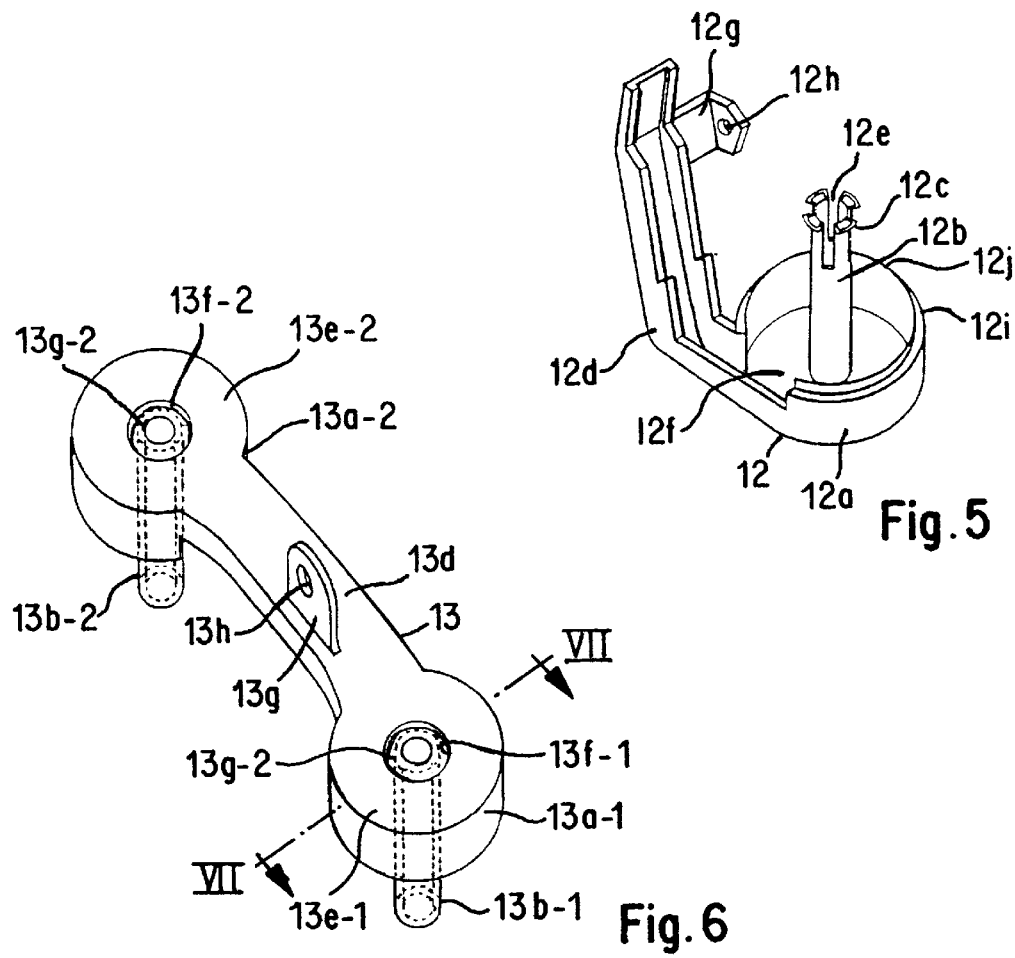
Fig. 5
Fig. 6
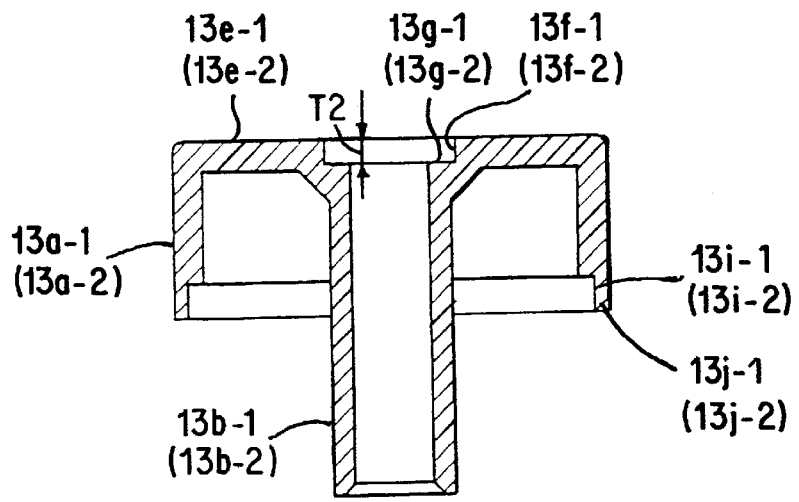
Fig. 7

WIRE HARNESS PROTECTOR

TECHNICAL FIELD

The present invention relates to a wire harness protector provided on a door opening and closing member of an automobile. Specifically, this wire harness protector is for double doors which open out from the rear of a vehicle main body. The wire harness protector reliably protects the wire harness when it moves with the doors and when these doors are opened out to greater than 90°.

BACKGROUND TO THE INVENTION

A wire harness provided on a body of an automobile is attached to various types of electrical and electronic devices. A wire harness is provided on the rear door of an automobile to operate the tail lamp, the rear wiper, etc. This harness is provided with a protector within which the wire harness is housed, this protector moving with the door in order to protect the wire harness and to prevent it from becoming exposed in the vicinity of the door hinges, and thus pinched.

FIG. 11 of this specification shows a wire harness protector 1 described in JP 4-11751. This protector 1 is attached to rear double doors capable of opening out to approximately 90°. The protector 1 is attached in the vicinity of a hinge H of a door D, the interior of the wire harness protector 1 housing a wire harness W/H passing to the door D from the interior of a body S, the wire harness protector 1 thereby protecting the wire harness W/H.

As FIG. 12 shows, the prior wire harness protector 1 comprises a first fixed member 2 which fits to the door D and a second fixed member 3 which fits to a car body panel P. The first fixed member 2 has a cylindrical member 2a which is closed at the base, an outer fitting member 2b within the central portion of the cylindrical member 2a, and a duct member 2d protruding from the cylindrical member 2a approximately horizontally.

The second fixed member 3 has a cylindrical member 3a which is closed at the top, a tubular axle is 3b within the central portion of the cylindrical member 3a, and a duct member 3d protruding from the cylindrical member 3a approximately horizontally. An inner circumference face of the outer fitting member 2b of the first fixed member 2 is provided with a groove 2c and, as shown in FIG. 13, a central portion of an outer base face 2e of the cylindrical member 2a is provided with a concave recess 2f which has a second base face 2g. An outer circumference face of the tubular axle 3b is provided with a stopping protrusion 3c.

To join the first fixed member 2 and the second fixed member together, after housing the wire harness W/H, the stopping protrusion 3c of the axle 3b is positioned against the groove 2c of the outer fitting member 2b. Then the axle 3b is inserted into the outer fitting member 2b. As FIG. 13 shows, the stopping protrusion 3c is now in a position whereby it protrudes to the exterior from the second base face 2g of the concave recess 2f and therefore retains it, and an upper face of a circumference wall of the cylindrical member 2a and a lower face of a circumference wall of the cylindrical member 3a make contact.

In this state, the wire harness protector 1 is fixed to the car body panel P and the rear door D. When the door is opened or closed, the first fixed member 2 and the second fixed member 3 rotate relatively, with the outer fitting member 2b and the tubular axle 3b serving as the centre.

However, during relative movement of the first fixed member 2 and the second fixed member 3, the stopping protrusion 3c and the groove 2c reach the same position. At this juncture, there is the problem that the stopping protrusion 3c can enter the groove 2c as a result of vertical displacement, thereby preventing the first fixed member 2 and the second fixed member 3 from rotating. There is the danger that, if rotation is forced in this state, the stopping protrusion 3c, the axle 3b, or another component may break, and the first fixed member 2 and the second fixed member 3 may separate.

Furthermore, the upper face of the circumference wall of the cylindrical member 2a and the lower face of the circumference wall of the cylindrical member 3a make contact while the first fixed member 2 and the second fixed member 3 are moving relatively. The width of these contacting faces is rather thin and there is the problem that slippage occurs between these contacting faces due to displacement in a horizontal direction. When slippage between these contacting faces occurs, there is the problem that the inner face of one circumference wall chafes against the outer face of the other circumference wall. This either prevents rotation or creates a space between the circumference walls from which the wire harness might be caught and damaged.

Moreover, although the double doors D are capable of opening out to a range of 90°, some double doors for a variety of purposes, are capable of opening out to 270°. Consequently there is the problem that, since the wire harness protector 1 is designed for a door opening angle of approximately 90°, if it were to be used for a door opening out to 270°, interference would occur between the duct member 2d, the duct member 3d, etc., and movement would be impossible beyond approximately 90°.

The present invention has taken the above problems into consideration, and aims firstly to present a wire harness protector suitable for doors opening out to 270°. Secondly, it aims to present a wire harness protector wherein a stopping member or contact faces of circumference walls will not prevent relative movement.

SUMMARY OF THE INVENTION

According to the invention, there is provided a wire harness protector for a wire harness extending between a body and a door, the door being adapted for pivoting movement through 270°, the protector comprising a first member adapted for fixing to a body, a second member adapted for fixing to a door, and an elongate member extending between the first and second members, the elongate member having opposite ends respectively pivoted to said first and second members, wherein the first and second members each include an upright cup having an upstanding axle member on the interior base thereof, and the elongate member has upturned cups at the ends thereof, each upturned cup having a depending axle member on the interior base thereof, said upstanding and depending axle members being mutually engageable to permit relative swivelling movement, and said upright and upturned cups being mutually engageable to define hollow chambers around said axle members whereby a wire harness can extend from said first member to said second member via said chambers and said elongate member.

Preferably, the axle members are tubular, and in a preferred embodiment they engage telescopically. In the latter case an inner axle member may have a slotted end, and radial protrusions at the top thereof for engagement over the exterior base of the cup of the exterior axle member. In this case, this slotted end is resilient, and preferably moulded of plastics material.

The upturned and upright cups may partially nest to define harness receiving chambers, respective circumferential walls preferably being relieved to bear upon one another. These circumferential walls preferably have the same diameter and wall thickness.

Each of the first, second and elongate members may define a channel linking said chambers, and for receiving a wire harness.

BRIEF DESCRIPTION OF THE DRAWINGS

Other features of the invention will be apparent from the following description of a preferred embodiment shown by way of example only in the accompanying drawings, in which:

FIG. 5 is a diagonal view showing the second fixed member of the wire harness protector;

FIG. 6 is a diagonal view of a rotating member of the wire harness protector;

FIG. 7 is a cross-section view along the line A—A;

DESCRIPTION OF PREFERRED EMBODIMENT

Figure 1:
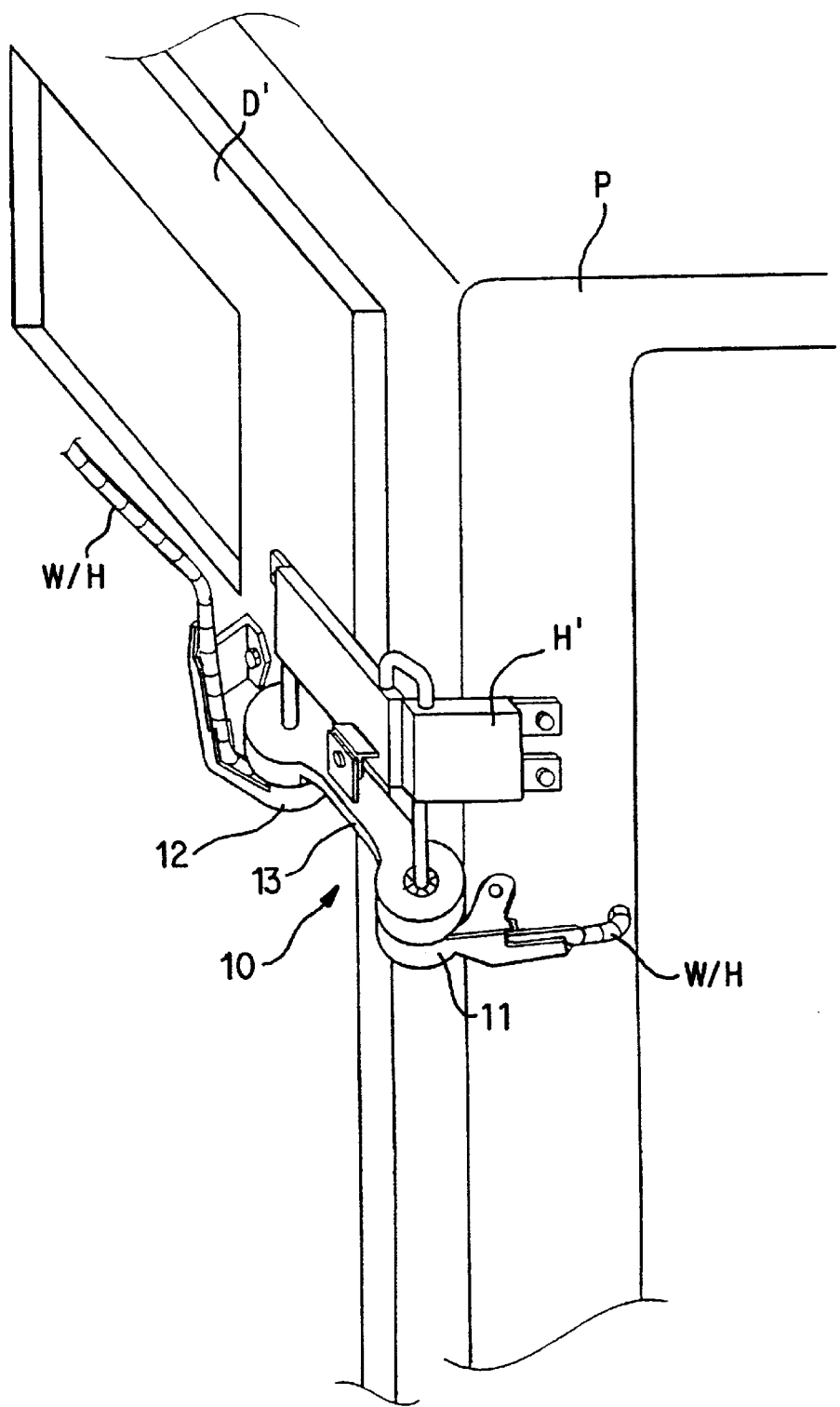
FIG. 1 is a diagonal view showing a wire harness protector of the present invention attached to an opening and closing portion of a door.

An embodiment of the present invention is described below with the aid of diagrams. FIG. 1 shows a wire harness protector 10 of the present invention in a state whereby it is attached to an opening and closing member of rear doors D' of an automobile. The doors D' are left and right double doors which are attached by hinges H' to the left and right ends of body panels P at both open sides of the rear of the automobile. These hinges H' allow the doors D' to open from a closed state to a maximum of 270°. A wire harness W/H for rear wipers or the like passes to the doors D' from the body panels P. The wire harness W/H is kept protected within the interior of the wire harness protectors 10 in the opening and closing members of the doors D'.

Figure 2:
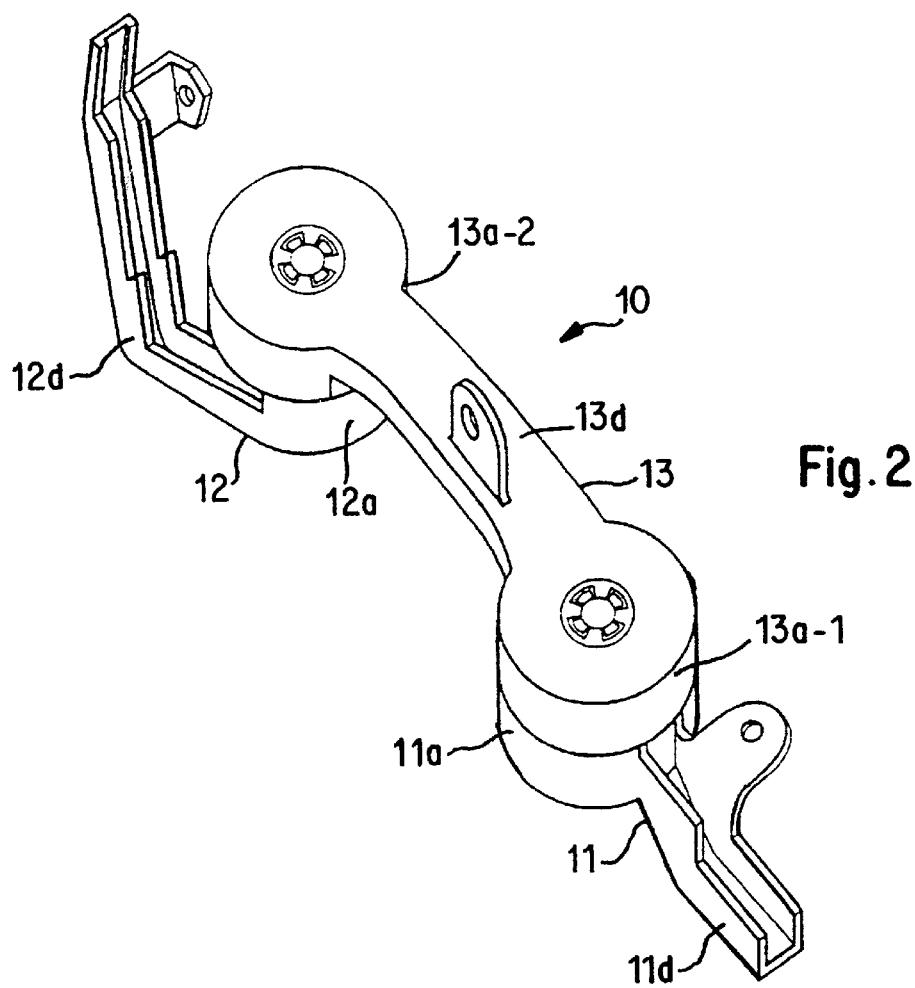
FIG. 2 is a diagonal view showing the wire harness protector of the present invention.

The wire harness protector 10, shown in FIG. 2, is moulded for plastic and comprises three parts; a first fixed member 11, a second fixed member 12, and an elongate and rotating member 13 (hereafter, "rotating member" with respect to the preferred embodiment). The first fixed member 11 and the second fixed member 12 are joined to the two ends of the rotating member 13 in a manner whereby they are capable of swivelling.

Figures 3, 4:
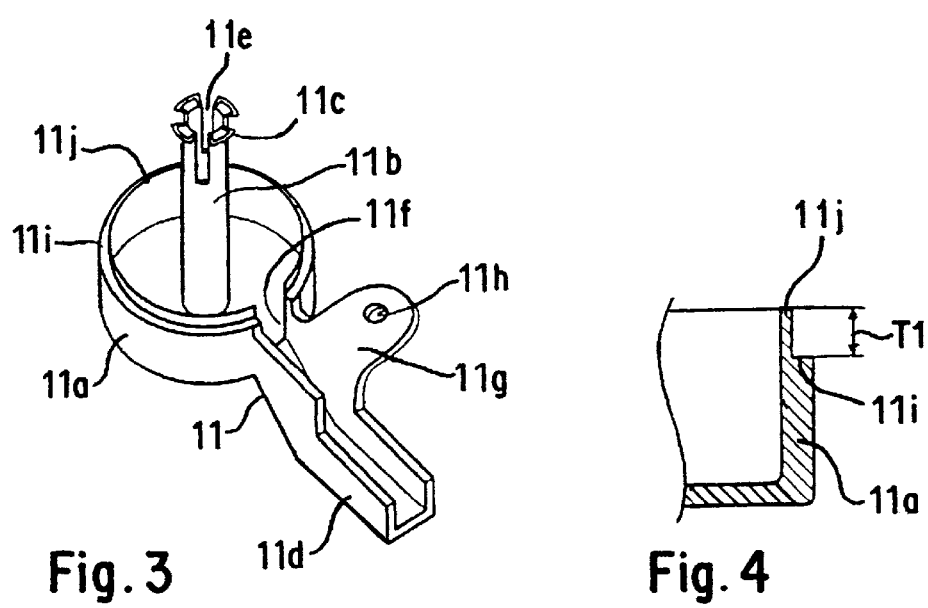
FIG. 3 is a diagonal view of a first fixed member of the wire harness protector.
FIG. 4 is a cross-sectional view of the main parts of the above.

FIG. 3 shows the first fixed member 11 which is fixed to the car body panel P. The first fixed member 11 has a cylindrical member 11a which is closed at the base forming an upright cup and has a tubular main axle 11b protruding from the central portion of a base face of the cylindrical member 11a. The outer diameter of the axle 11b, although large enough to maintain the strength of the structure, is less than the inner diameter of an outer fitting cylinder 13b of the rotating member 13 (to be explained), having at most 0.2 mm clearance. This ensures smooth rotation.

Notches 11e are provided at four intervals around the outer circumference of the upper edge of the axle 11b. Locking claws 11c protruding from an outer circumference face are provided on four tips which remain between the cut-out notches. The upper face of each locking claw 11c is tapered to allow easy insertion. The number of notches 11e and locking claws 11c is not restricted to four. A plurality thereof, such as three or five, is equally suitable.

As shown in FIG. 4, an inner fitting member 11j is formed by cutting into the upper edge of an upper outer circumference 11i of a circumference wall of the cylindrical member 11a. Specifically, the outer face of the circumference wall of the upper outer circumference 1i is cut into to form a step, the upper outer circumference 11i thereby forming a cross-sectional L-shape. The height T1 of the inner fitting member 11j is determined by taking into consideration the vertical displacement when the first fixed member 11 and the rotating member 13 are fitted together. Even when this displacement is at its maximum, it is designed not be elevated above any fitting members.

In addition, a portion of the outer circumference of the cylindrical member 11a is cut into to form a wire harness through member 11f. A duct member 11d for housing the wire harness protruded approximately horizontally from this outer circumference of the cylindrical member 11a at a location aligned with the wire harness through member 11f. The duct member 11d is provided with a stopping member 11g which has a bolt hole 11h. The direction in which the duct member 11d protrudes may be changed so as to correspond with the direction of distribution of the wire harness.

FIG. 5 shows the second fixed member 12 which is fixed to the door D'. The second fixed member 12 has approximately the same configuration and shape as the first fixed member 11. That is, the second fixed member 12 has a cylindrical member 12a which is closed at the base forming an upright cup and a tubular axle 12b protruding from the central portion of a base face of the cylindrical member 12a. The upper edge of the axle 12b is provided with notches 12e and locking claws 12c provided on the remaining tips. Furthermore, an inner fitting member 12j is formed by cutting into the upper edge of an upper outer circumference 12i of a circumference of the cylindrical member 12a, and a portion of the outer circumference wall of the cylindrical member 12a, and a portion of the outer circumference of the cylindrical member 12a is cut into to form a wire harness through member 12f. A duct member 12d for housing the wire harness protrudes approximately diagonally upwards from this outer circumference of the cylindrical member 12a at a location aligned with the wire harness through member 12f. The duct member 12d is provided with a stopping member 12g which has a bolt hole 12h. The dimensions of the outer circumference of the axle 12b, and the height of the inner fitting member 12j, are identical with that of the first fixed member 11.

The rotating member 13 shown in FIG. 6 is provided with a first cylindrical member 13a-1 and a second cylindrical member 13a-2. These are closed at the top forming upturned cups and an outer fitting cylinder 13b-1 and an outer fitting cylinder 13b-2 protrude downwards from the central portion of cylindrical upper faces thereof forming depending axle members from the upturned cups. A connecting frame 13d, within which the wire harness is housed, extends between the pair of cylindrical members. The connecting frame 13d is provided with a stopping member 13g which has a bolt hole 13h. Furthermore, the outer fitting cylinders 13b-1 and 13b-2 are cylindrical in shape and fit around the axles 11b and 12b of the first fixed member 11 and the second fixed member 12. This allows the axles 11b and 12b to have clearance to swivel.

Grooves 13f-1 and 13f-2 are provided on upper faces 13e-1 and 13e-2 of the first cylindrical member 13a-1 and the second cylindrical member 13a-2. These grooves 13f-1 and 13f-2 adjoin with the edge circumference of tubular inner faces of the outer fitting cylinders 13b-1 and 13b-2. The grooves 13f-1 and 13f-2 have second lower faces 13g-1 and 13g-2 which are lower than the upper faces 13e-1 and 13e-2 by a height T2. This height T2 is slightly greater than the height of the locking claws 11c and 12c of the first fixed member 11 and the second fixed member 12 and, in a joined state, the locking claws 11c and 12c are retained in a housed state within the grooves 13f-1 and 13f-2. Moreover, the grooves 13f-1 and 13f-2 need not be provided in the case where it is not a particular problem if the locking claws 11c and 12c protrude above the upper faces 13e-1 and 13e-2 when the locking claws 11c and 12c are engaged.

As FIG. 7 shows, the outer fitting members 13j-1 and 13j-2 are cut into lower edges of lower inner circumstances 13i-1 and 13i-2 of the first cylindrical member 13a-I and the second cylindrical member 13a-2. In the present embodiment, the inner faces of the circumference walls of the lower inner circumferences 13i-1 and 13i-2 are cut into to form a step, the lower inner circumferences 13i-1 and 13i-2 thereby forming a cross-sectionally L-shape. Moreover, the inner diameters of the outer fitting members 13j-1 and 13j-2 are at most 0.1mm greater than the outer diameter of the inner fitting members 11i and 12j of the first and second fixed members 11 and 12, thereby permitting satisfactory rotation when these are joined together.

Figure 8:
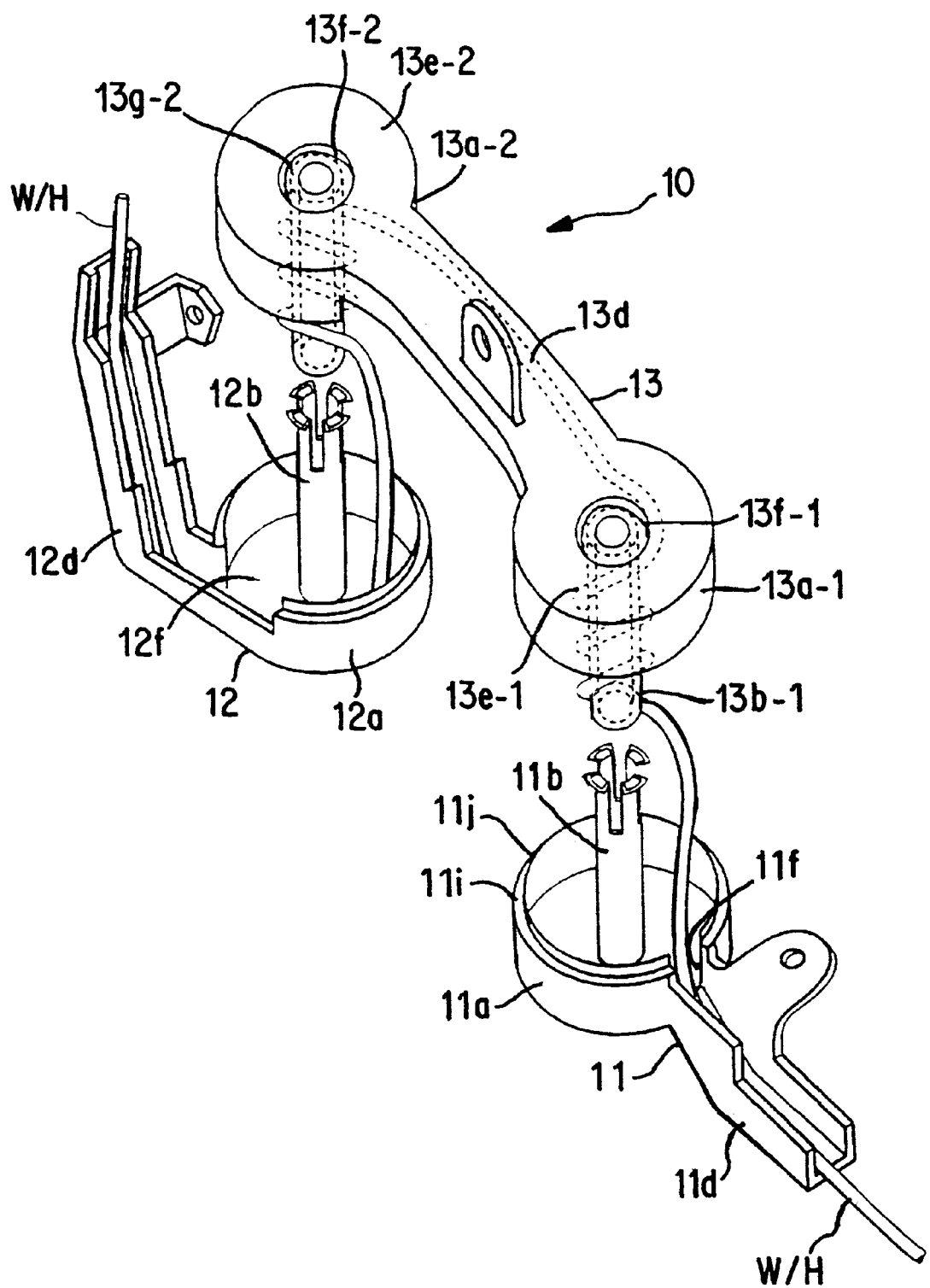
FIG. 8 is a diagonal view showing the wire harness protector with a wire harness in a housed state.

The wire harness W/H is housed within the wire harness protector 10 comprising the first fixed member 11, the second fixed member 12 and the rotating member 13 as shown in FIG. 8. Firstly, while the first fixed member 11, etc. are in a separated state, the wire harness W/H, which comes from the car body panel P, is passed along the interior of the duct member 11d of the first fixed member 11 and is wound in a spiral several times around the outer circumference face of the outer fitting cylinder 13b-1 of the rotating member 13. Then, the wire harness W/H is passed along a space between the first cylindrical member 13a-1 along the interior of the connecting frame 13d, wound in a spiral several times around the outer circumference face of the outer fitting cylinder 13b-2 of the second cylindrical member 13a-2, passed along the interior of the duct member 12d of the second fixed member 12, and finally goes to the door D'. Once the wire harness W/H is housed as described above, the first cylindrical member 13a-1 and the second cylindrical member 13a-2 are fitted onto the first fixed member 11 and the second fixed member 12.

Figure 9A:
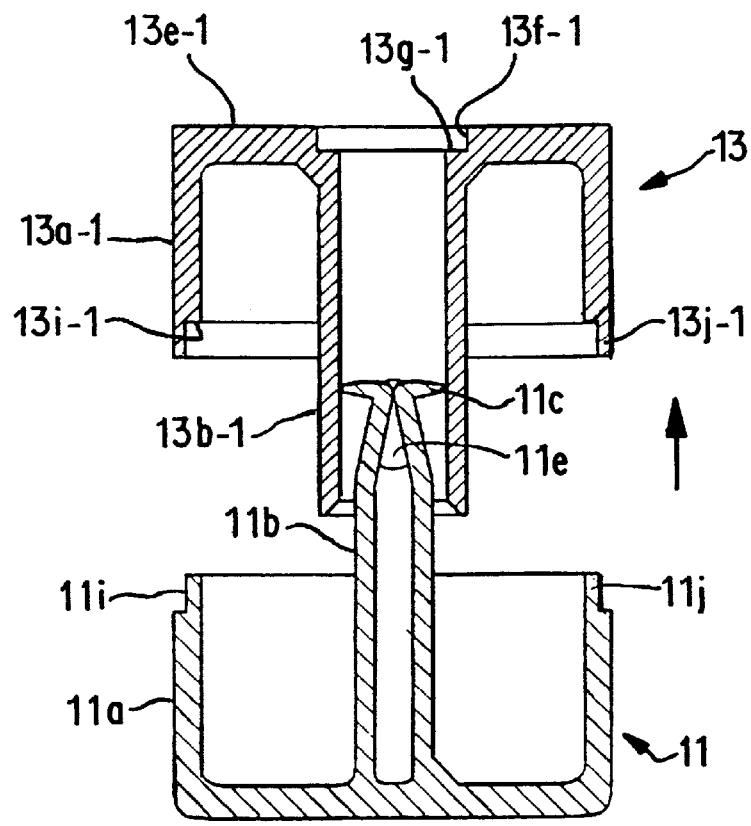
FIG. 9a is a cross-sectional view showing of the first fixed member and the rotating member in a partially joined condition.
Figure 9B:
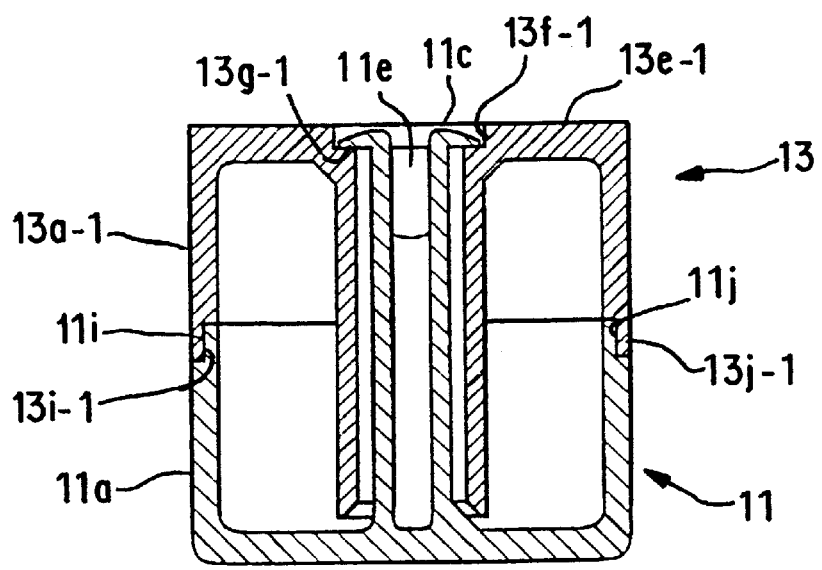
FIG. 9b is a cross-sectional view showing the first fixed member and the rotating member in a fully joined condition.

Specifically, as shown in FIGS. 9a and 9b, the axle 11b of the first fixed member 11 is inserted into the interior of the outer fitting cylinder 13b-1 of the rotating member 13. The locking claws 11c protrude from the upper edge of the axle 11b, and the notches 11e are formed in the remaining space between these locking claws 11c. As a result, when the axle 11b is inserted, the upper edge thereof becomes narrower in diameter by bending inwards into the space provided by the notches 11e, and the axle 11b is passed through the interior of the outer fitting cylinder 13b-1 in this state. Thereafter, the locking claws 11c return to their original shape and fit with the second lower face 13g-1 of the groove 13f-1. The first fixed member 11 and the rotating member 13 are thereby joined in a state whereby swivelling is possible.

In the same manner as shown in FIGS. 9a and 9b, after the outer fitting cylinder 13b-1 has been fitted around the tubular main axis 11b in a state wherein swivelling is possible, the outer fitting member 13j-1 of the rotating member 13 is fitted around the inner fitting member 11j of the circumference wall of the first fixed member 11. By this means, an adequate clearance is maintained when the first cylindrical member 13a-1 of the rotating member 13 rotates relative to the first fixed member 11, and the two can be fitted together with the position of the two in a horizontal direction being maintained without slippage. Moreover, the second fixed member 12 and the rotating member 13 are joined in the same manner as above, their rotation is satisfactory, and they have no slippage in position.

As shown in FIG. 1, the first fixed member 11 is fixed to the car body panel P by a bolt which is passed through the stopping member 11g, the second fixed member 12 thereof is fixed to the door D' by a bolt which is passed through the stopping member 12g, and the rotating member 13 thereof is fixed to the hinge H' by a bolt which is passed through the stopping member 13g.

Figure 10A:
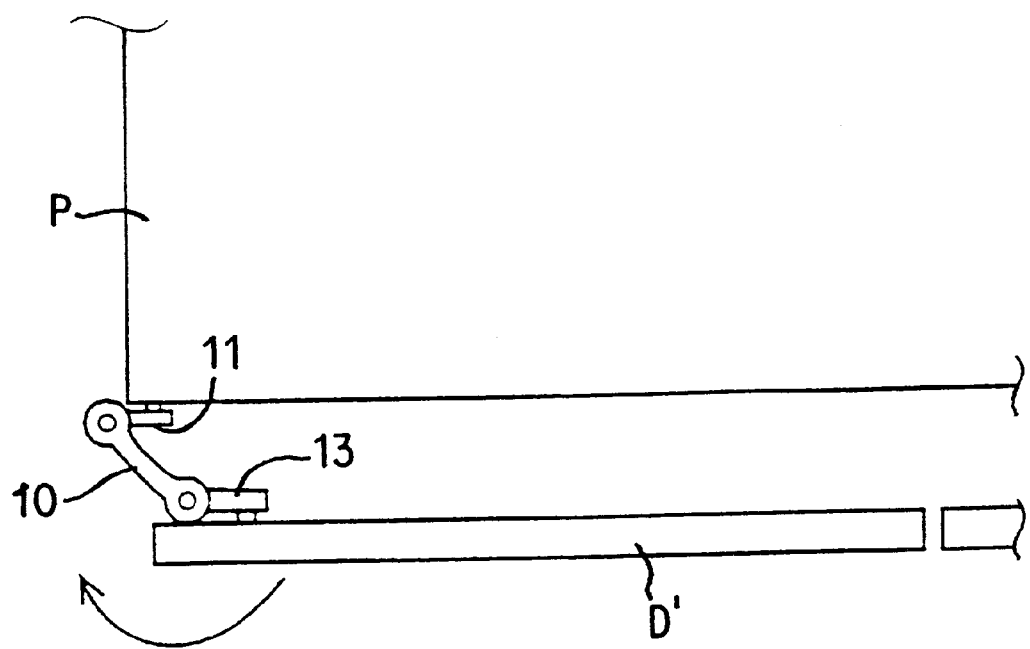
FIG. 10a is a plan view showing an open state of the door.
Figure 10B:
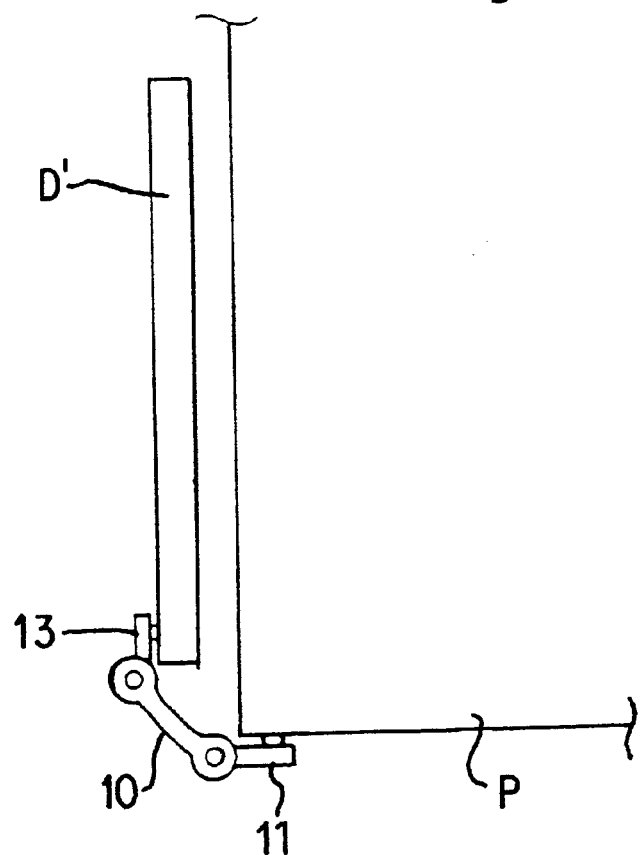
FIG. 10b is a plan view showing a closed state of the door.
Figure 11:
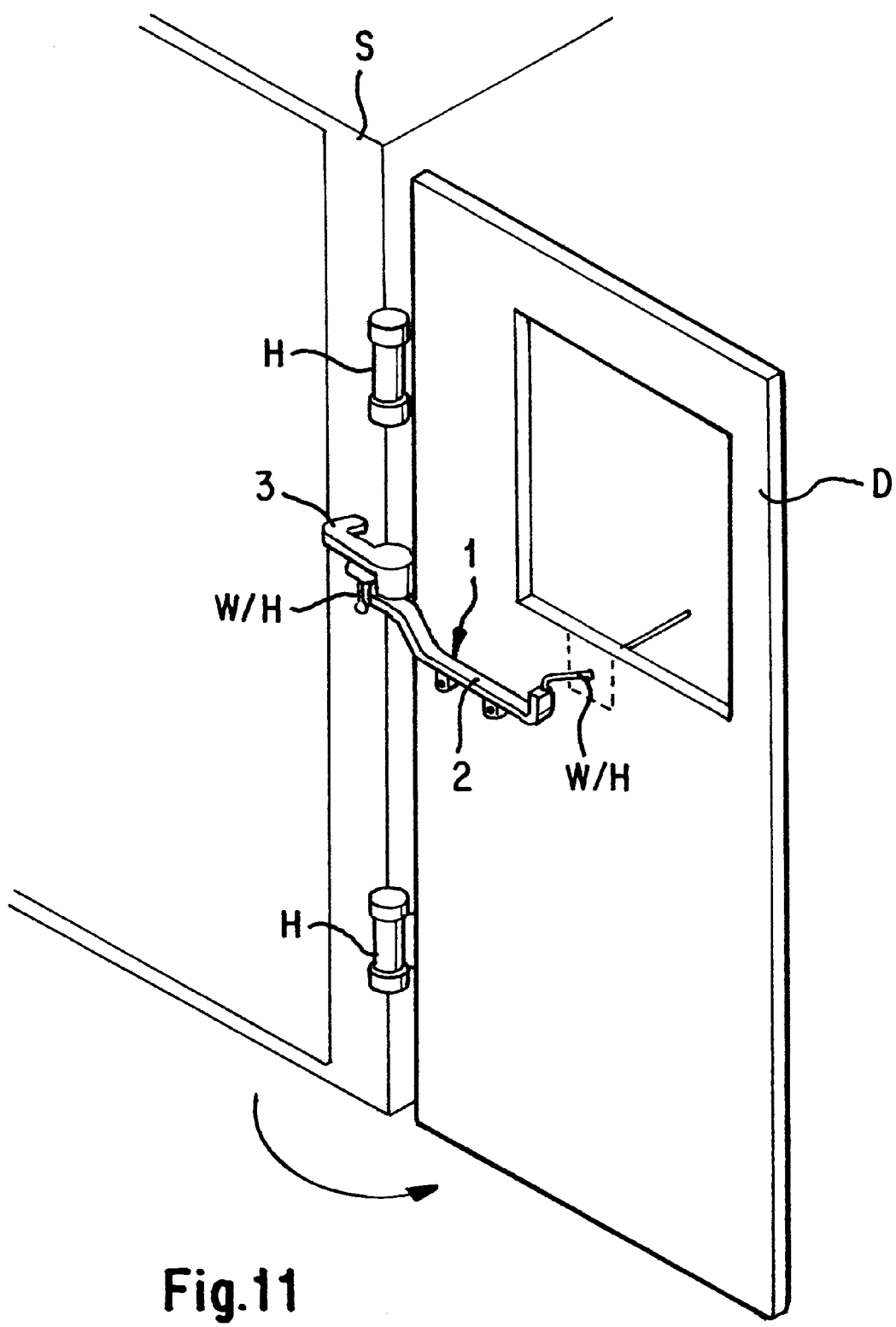
FIG. 11 is a diagonal view showing a conventional wire harness protector attached to an opening and closing portion of a door.
Figure 12:
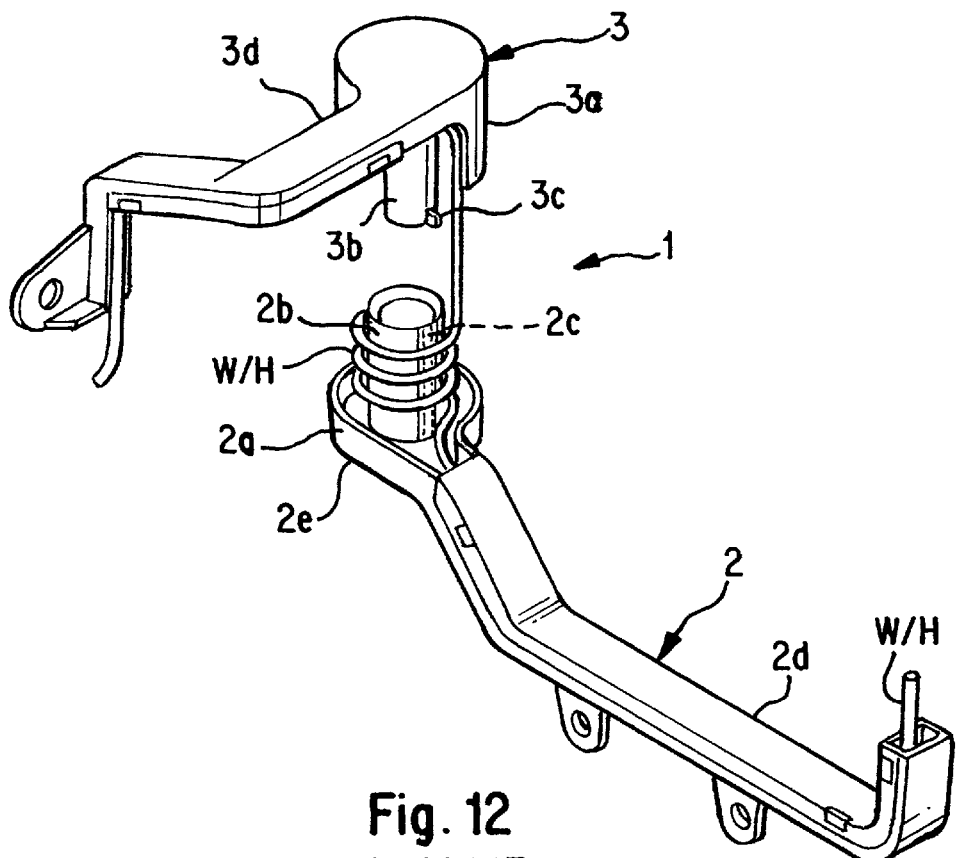
FIG. 12 is a diagonal view showing a wire harness in a housed state within the conventional wire harness protector; and, FIG. 13 is a diagonal view of a stopping member of the conventional wire harness protector.
Figure 13:
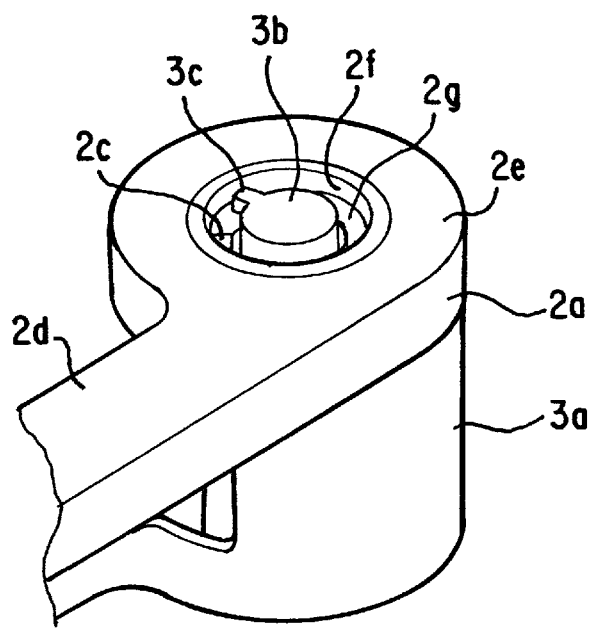

As shown in FIGS. 10a and 10b, the wire harness protector 10 which is attached to the door D' is capable of rotating from a closed state to a fully open state of 270°. The centre of rotation is provided at two locations, the joining member of the first fixed member 11 and the rotating member 13 rotating to 150° and the joining member of the second fixed member 12 and the rotating member 13 rotating to 120°, resulting in a total rotation of 270°. In addition, the angle of rotation of these joining members is not limited to that of the above embodiment. Each of these joining members may be suitably modified as long as the total angle of rotation is 270°.

Moreover, the embodiment is not limited to having the first fixed member 11, the second fixed member 12, and the rotating member 13. For example, the joining configuration of the embodiment described above may be reversed, wherein a first and a second fixed member are provided with outer fitting cylinders and a rotating member is provided with a tubular axle having locking claws. Further, the present embodiment is not suitable only for double doors, but is also suitable for single doors which open and close from the side and open to a range of 270°.

As the above explanation has made clear, the wire harness protector of the present invention reliably protects a wire harness coming from the panel of a car body by pivoting with the opening and closing of the door even when the door has an opening range of 270°. Moreover, the pivoting members of the wire harness protector maintain the same joined state irrespective of the position to which they are pivoted, and consequently pivoting is not adversely affected. Further, even the contacting members of the circumference walls of the cylindrical members are kept together during movement. As a result, satisfactory movement can be reliably maintained.

What is claimed is:

1. A wire harness protector for a wire harness extending between a body and a door, the door being adapted for pivoting movement through 270°, the protector comprising a first member adapted for fixing to a body, a second member adapted for fixing to a door, and an elongate member extending between the first and second members, the elongate member having opposite ends respectively pivoted to said first and second members, wherein the first and second members each include an upright cup having an upstanding axle member on an interior base thereof, and the elongate member has upturned cups at the opposite ends thereof, each upturned cup having a depending axle member on an interior base thereof, said upstanding and depending axle members being mutually engageable to permit relative swivelling movement, and said upright and upturned cups being mutually engageable to define hollow chambers around said axle members whereby a wire harness can extend from said first member to said second member via said chambers and said elongate member.

2. A protector according to claim 1 wherein said upstanding and depending axle members are tubular.

3. A protector according to claim 2 wherein said upstanding and depending axle members are adapted for telescopic engagement.

4. A protector according to claim 3 wherein each pair of engageable axle members includes an internal axle member having a resilient end with axial slots, projections defined by said slots having radially outwardly extending protrusions, and said protrusions being radially inwardly deformable for telescopic passage through a corresponding external axle member for latching engagement with an external base of a respective cup.

5. A protector according to claim 4 wherein said external axle member includes a recess in said external base of said respective cup, said recess being adapted to receive said protrusions.

6. A protector according to claim 1 wherein said upright and upturned cups nest partially within one another.

7. A protector according to claim 6 wherein said upturned and upright cups have substantially the same diameter and wall thickness, a circumferential wall of one of said cups being thinned from an exterior, and a circumferential wall of a mating one of said cups being thinned from an interior so as to permit nesting.

8. A protector according to claim 7 wherein said circumferential walls are thinned equally to a constant thickness.

9. A protector according to claim 1 wherein said elongate member defines a harness receiving channel between said chambers.

10. A protector according to claim 1 wherein said first and second members each define harness receiving channels from respective chambers.

11. A wire harness protector for a wire harness extending between a body and a door, the door being adapted for pivoting movement through more than 180°, the protector comprising a first member adapted for fixing to a body, a second member adapted for fixing to a door, and a rotating member extending between the first and second members, the rotating member having opposite ends respectively pivoted to said first and second members, wherein the first member includes a first cup having a first axle member on an interior base thereof, the second member includes a second cup having a second axle member on an interior base thereof, and the rotating member includes a first end cup and a second end cup at the opposite ends thereof, the first and second end cups each having an axle member on an interior base thereof, the first axle member being mutually engageable with the axle member of the first end cup to permit relative swivelling movement therebetween, the second axle member being mutually engageable with the axle member of the second end cup to permit relative swivelling movement therebetween, and the first and second cups being mutually engageable with the first and second end cups to define hollow chambers around the axle members whereby a wire harness can extend from the first member to the second member via the chambers and the rotating member.

* * * * *